(12) United States Patent
Kesler

(10) Patent No.: US 12,388,341 B2
(45) Date of Patent: *Aug. 12, 2025

(54) SYSTEMS AND METHODS FOR MAGNETIC ROTATIONAL COUPLING DEVICES

(71) Applicant: MATTUR HOLDINGS, INC., Scottsdale, AZ (US)

(72) Inventor: Kris Kesler, Scottsdale, AZ (US)

(73) Assignee: MATTUR HOLDINGS, INC., Scottsdale, AZ (US)

( * ) Notice: Subject to any disclaimer, the term of this patent is extended or adjusted under 35 U.S.C. 154(b) by 233 days.

This patent is subject to a terminal disclaimer.

(21) Appl. No.: 18/114,760

(22) Filed: Feb. 27, 2023

(65) Prior Publication Data

US 2023/0208272 A1 Jun. 29, 2023

Related U.S. Application Data

(63) Continuation of application No. 17/012,492, filed on Sep. 4, 2020, now Pat. No. 11,594,947.

(60) Provisional application No. 62/896,251, filed on Sep. 5, 2019.

(51) Int. Cl.
*H02K 49/10* (2006.01)

(52) U.S. Cl.
CPC ................... *H02K 49/108* (2013.01)

(58) Field of Classification Search
CPC .. H02K 1/00; H02K 1/12; H02K 1/18; H02K 21/24; H02K 41/00; H02K 41/03; H02K 49/10; H02K 49/102

See application file for complete search history.

(56) References Cited

U.S. PATENT DOCUMENTS

| | | | |
|---|---|---|---|
| 2,722,617 A | * | 11/1955 | Cluwen ............... H02K 49/102 74/29 |
| 4,459,501 A | | 7/1984 | Fawzy |
| 4,996,457 A | | 2/1991 | Hawsey et al. |
| 6,037,696 A | | 3/2000 | Sromin et al. |
| 6,373,162 B1 | | 4/2002 | Liang et al. |
| 6,841,916 B2 | | 1/2005 | Chiarenza |
| 7,489,060 B2 | | 2/2009 | Qu et al. |

(Continued)

FOREIGN PATENT DOCUMENTS

| DE | 10215448 A1 | 10/2003 |
|---|---|---|
| DE | 10215488 A1 | 10/2003 |

(Continued)

OTHER PUBLICATIONS

Office Action for related Canadian Application No. 3,153,539; action dated Apr. 18, 2024; (4 pages).

(Continued)

*Primary Examiner* — Tran N Nguyen
(74) *Attorney, Agent, or Firm* — K&L Gates LLP

(57) ABSTRACT

Improved magnetic rotor assemblies are provided. In one embodiment, a magnetic rotor assembly includes two or more rotor disks. The rotor disks may each contain corresponding sets of permanent magnets, which may be circumferentially disposed around the disks. The disks may then positioned near one another such that the disks are magnetically coupled. In certain instances, the N-poles of the permanent magnets may face one another. In other instances, the S-poles of the permanent magnets may face one another.

16 Claims, 6 Drawing Sheets

(56) References Cited

U.S. PATENT DOCUMENTS

| | | |
|---|---|---|
| 9,287,761 B2 | 3/2016 | Reinosa et al. |
| 9,997,986 B2 | 6/2018 | Haggard |
| 10,141,821 B2 | 11/2018 | Takemoto et al. |
| 11,594,947 B2 * | 2/2023 | Kesler ................. H02K 49/102 |
| 2007/0284956 A1 | 12/2007 | Petrovich et al. |
| 2008/0001491 A1 | 1/2008 | Qu et al. |
| 2009/0230811 A1 | 9/2009 | Asano |
| 2012/0011962 A1 | 1/2012 | Richards |

FOREIGN PATENT DOCUMENTS

| | | |
|---|---|---|
| KR | 20080092029 A | 10/2008 |
| WO | 2019/022624 | 1/2019 |
| WO | 201922624 A1 | 1/2019 |

OTHER PUBLICATIONS

ISR and Written Opinion for International App. No. PCT/US20/49496 dated Dec. 9, 2020 (16 pages).
Office Action for related Canadian Application No. 3,153,539; action dated Aug. 30, 2023; (4 pages).
Supplementary Search Report for related European Application No. 20861126.9; action dated Sep. 21, 2023; (10 pages).
Office Action for related Saudi Arabian Application No. 522431871; action dated Oct. 7, 2023; (7 pages).

* cited by examiner

SYSTEMS AND METHODS FOR MAGNETIC ROTATIONAL COUPLING DEVICES

CROSS-REFERENCE TO RELATED APPLICATIONS

The present application claims priority to U.S. Provisional Patent Application No. 62/896,251 filed on Sep. 5, 2019, and co-pending U.S. patent application Ser. No. 17/012,492, filed on Sep. 4, 2020, the disclosure of each of which is incorporated herein by reference for all purposes.

TECHNICAL FIELD

The present disclosure generally relates to rotational coupling devices, and more particularly relates to reduced-friction torque transmission components.

BACKGROUND

Mechanical machines transform and/or transfer energy through the use of fixed and moving components interposed between the source of power and the load or work to be done. The result is a kinematic chain of linkages, couplings, gears, and other such mechanical interfaces that are prone to frictional energy loss in the form of heat and sound. These and other such dissipative forces can significantly reduce a system's efficiency, which is typically expressed as the ratio of power output to power input.

While various types of low-friction couplings have been developed over the years, such designs are unsatisfactory in a number of respects. For example, magnetic "gears" have been developed that feature an array of strong permanent magnets disposed circumferentially at regular angular intervals around their perimeters. Such mechanical couplings have been successful in providing gear-like movement with little or no friction; however, their use of a simple, single layer of magnets has proven non-optimal with respect to providing a strong, slip-free rotational coupling between elements at high rotational speeds and torques.

Accordingly, systems and methods are needed that overcome these and other limitations of the prior art. For example, there is a long-felt need for highly efficient, frictionless rotational couplings that can operate under high power conditions.

SUMMARY

The present disclosure presents new and innovative magnetic rotor assemblies and methods for providing the same. In a first aspect, a magnetic rotor assembly is provided that includes a first rotor disk and a second rotor disk. The first rotor disk may include a first disk and a first set of permanent magnets circumferentially disposed about the first disk such that their N-poles face outward from a first side of the first disk. The second rotor disk may include a second disk and a second set of permanent magnets circumferentially disposed about the disk such that their N-poles face outward from a first side of the second disk. The first side of the first disk may face the first side of the second disk such that the first rotor disk and the second rotor disk are magnetically coupled to each other.

In a second aspect according to the first aspect, the first set of permanent magnets may be circumferentially disposed about the first disk such that their S-poles face outward from the first side of the first disk and the second set of permanent magnets may be circumferentially disposed about the second disk such that their S-poles face outward from the first side of the second disk.

In a third aspect according to any of the first or second aspects, the first side of the first disk is separated from the first side of the second disk.

In a fourth aspect according to any of the first through third aspects, the first side of the first disk is separated from the first side of the second disk by 0.125 to 0.635 cm.

In a fifth aspect according to any of the first through fourth aspects, the first side of the first disk is in contact with the first side of the second disk.

In a sixth aspect according to any of the first through fifth aspects, each of the magnets of the first set of permanent magnets is a disc-shaped neodymium magnet secured within a corresponding recess within the first disk.

In a seventh aspect according to any of the first through sixth aspects, the first and second sets of permanent magnets each comprise 12 rare-earth magnets.

In an eighth aspect according to any of the first through seventh aspects, the rare-earth magnets have a diameter of approximately 1 inch.

In a ninth aspect according to any of the first through eighth aspects, the first disk body and second disk each comprise graphite and are approximately 7 inches in diameter.

In a tenth aspect according to any of the first through ninth aspects, each of the permanent magnets are positioned approximately ⅛ of an inch from their respective disk. In an eleventh aspect, a method is provided that includes providing a first disk and a second disk and positioning a first set of permanent magnets within the first disk, such that the first set of permanent magnets are circumferentially disposed about the first disk. The method may also include positioning a second set of permanent magnets within the second disk, such that the second set of permanent magnets are circumferentially disposed about the second disk. The method may further include positioning the first disk and the second disk such that the first set of permanent magnets face the second set of permanent magnets such that the first and second disks are magnetically coupled to form a magnetic rotor assembly.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the disclosed subject matter.

BRIEF DESCRIPTION OF THE DRAWING FIGURES

The present invention will hereinafter be described in conjunction with the appended drawing figures, wherein like numerals denote like elements, and:

Figure 3A:
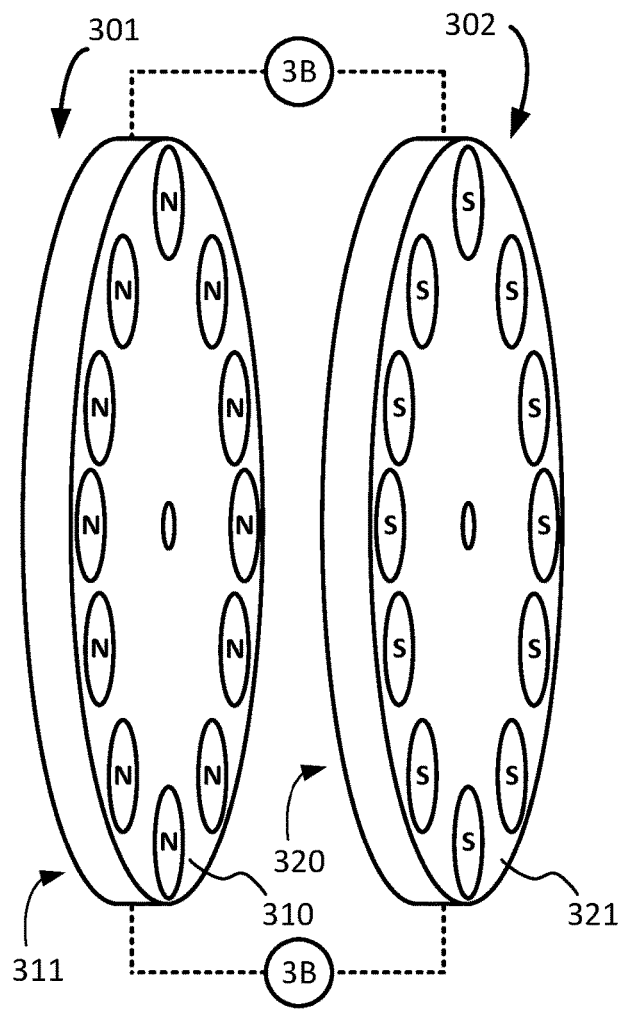
Figure 3B:
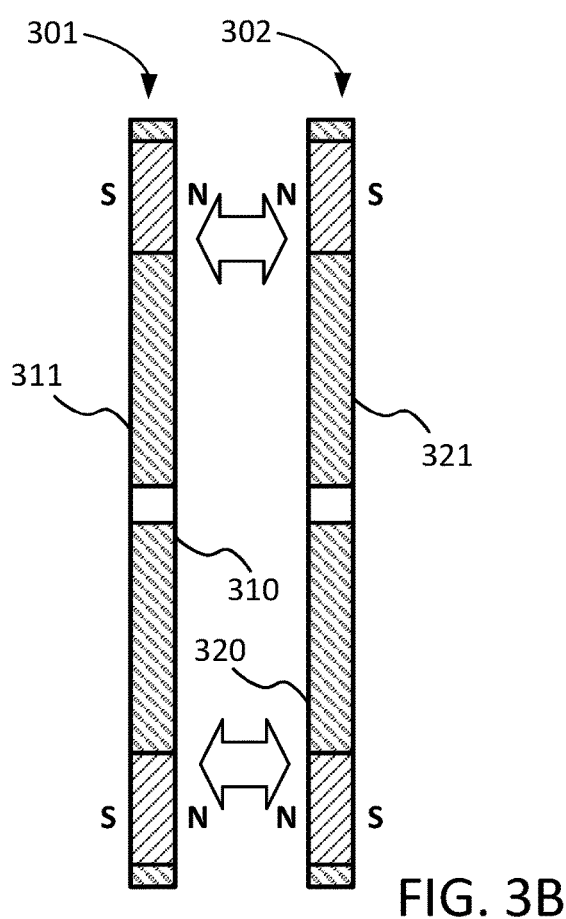
Figure 4A:
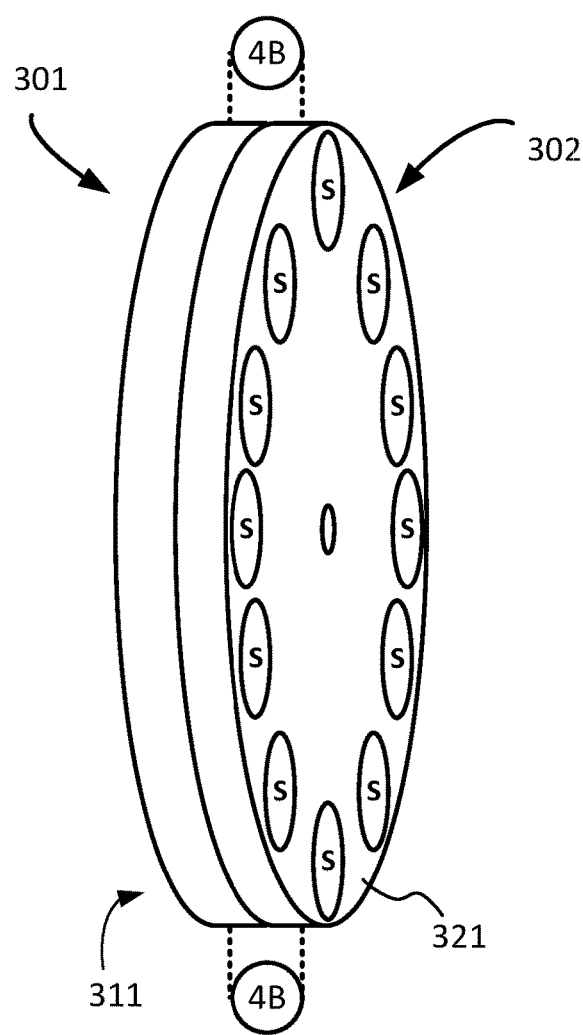
Figure 4B:
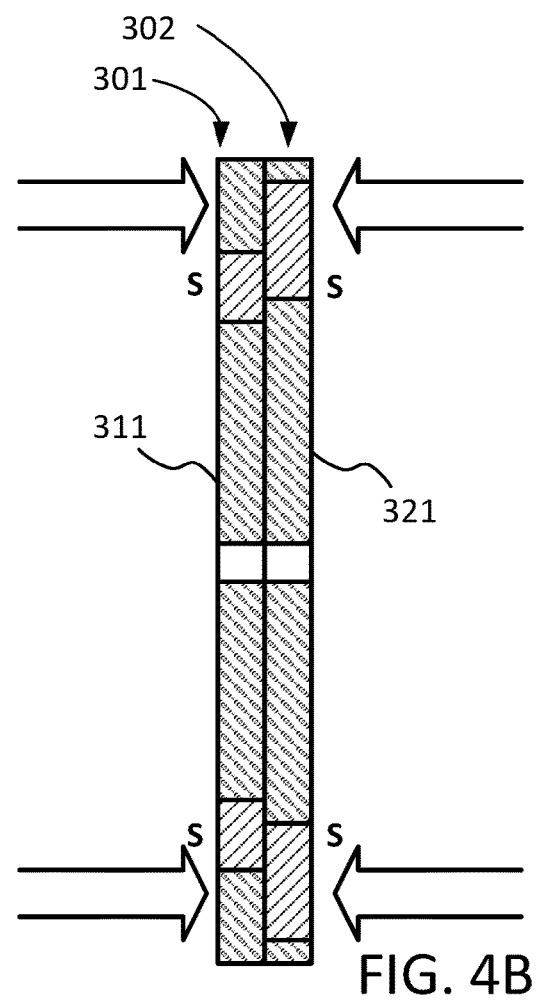
Figure 5:
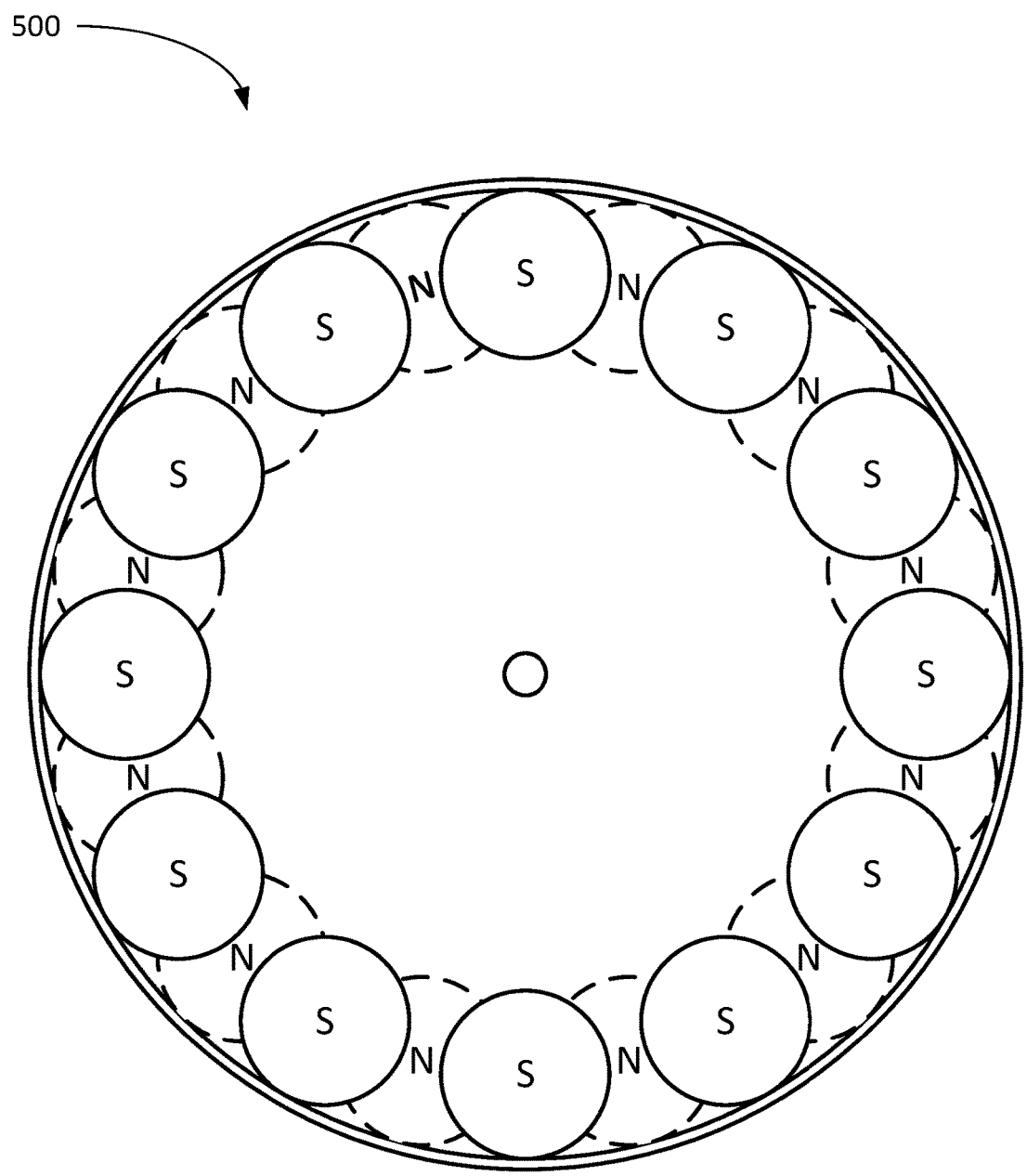
Figure 6:
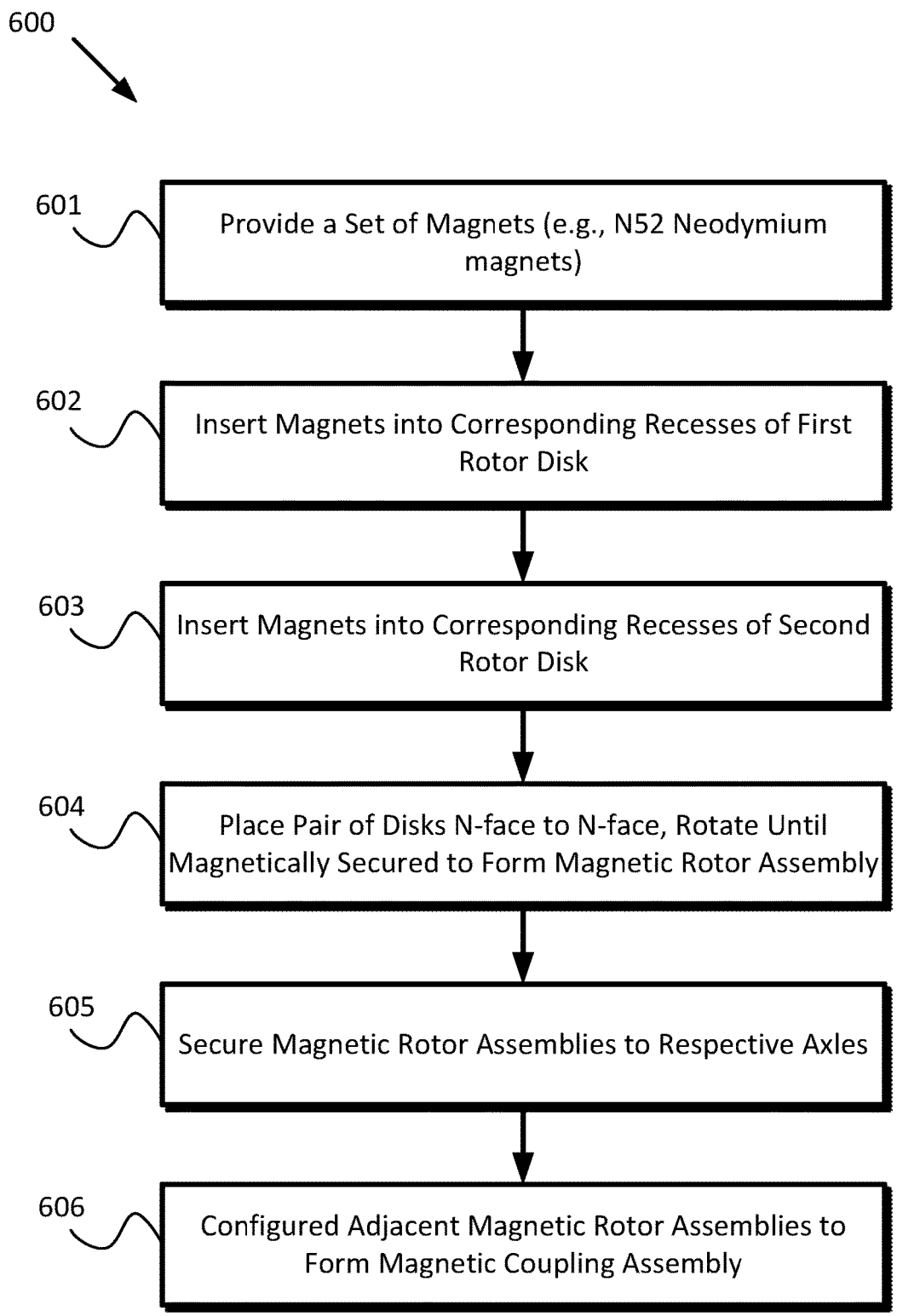

FIGS. 3A, 3B, 4A, and 4B sequentially illustrate the joining of two magnetic rotor disks together to form a magnetic rotor assembly in accordance with one embodiment;

FIG. 5 is a partially transparent view of the magnetic rotor assembly illustrated in FIGS. 3A, 3B, 4A, and 4B; and FIG. 6 is a flowchart illustrating a method of forming a magnetic coupling assembly in accordance with various embodiments.

DETAILED DESCRIPTION OF PREFERRED EXEMPLARY EMBODIMENTS

The following detailed description of the invention is merely exemplary in nature and is not intended to limit the invention or the application and uses of the invention. Furthermore, there is no intention to be bound by any theory presented in the preceding background or the following detailed description.

Various embodiments of the present invention relate to an improved, frictionless torque transmission device that employs a novel form of magnetic coupling rather than mechanical coupling to reduce or substantially eliminate frictional power losses.

Referring now to the general block diagram of FIG. 1, a magnetic coupling assembly 100 in accordance with an exemplary embodiment generally includes an input shaft 110 rigidly coupled to a substantially disc-shaped magnetic rotor assembly (or "input rotor assembly") 131, which is magnetically coupled (as described in further detail below) to a first magnetic rotor assembly (or "output rotor assembly") 132 and a second magnetic rotor assembly (or "output rotor assembly") 133. Output rotor assemblies 132 and 133 are rigidly coupled to respective output shafts 121 and 122 such that rotation of input shaft 110 results in a corresponding rotation of output shafts 121 and 122.

Figure 1:
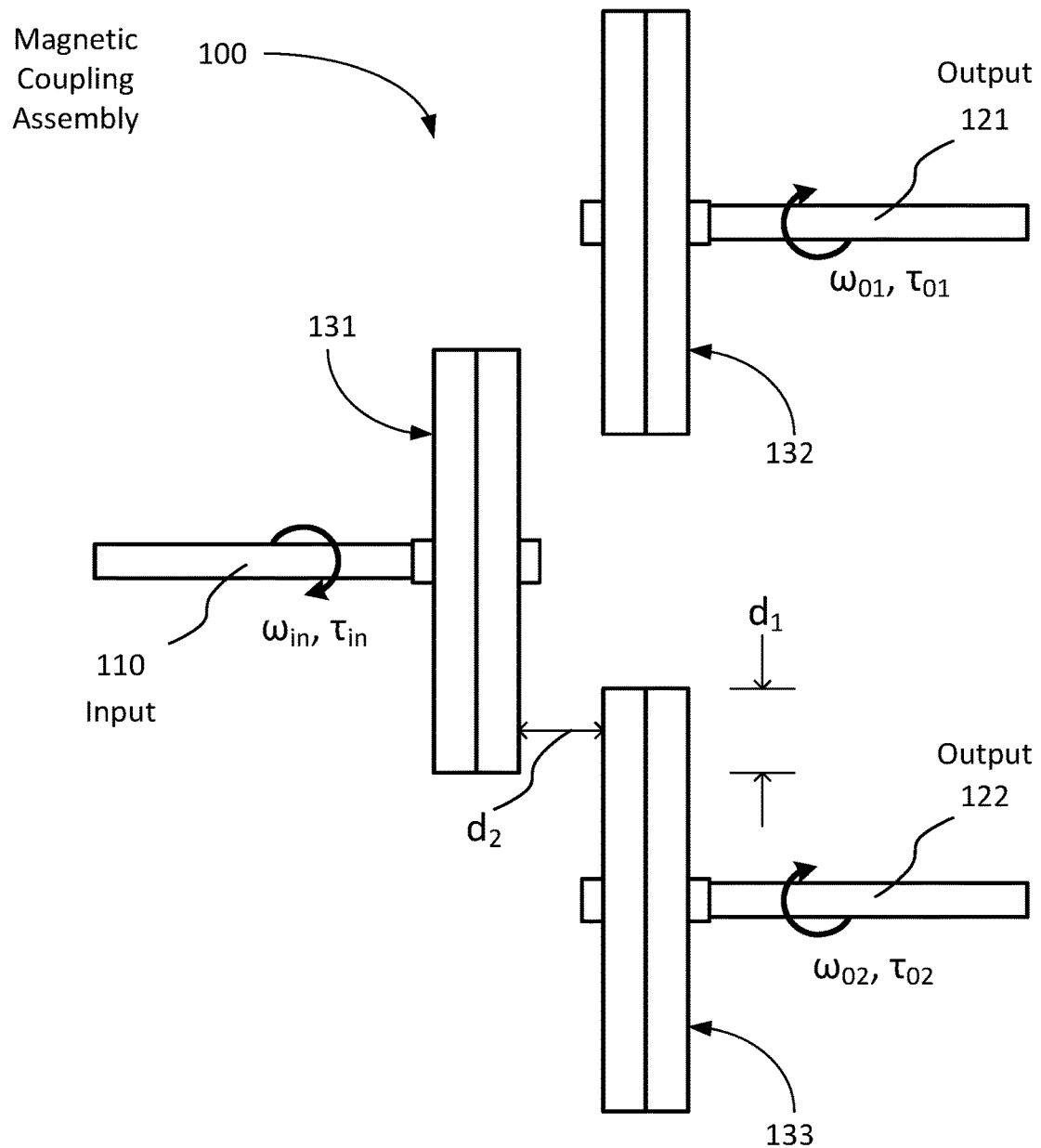
FIG. 1 is schematic overview of a magnetic coupling assembly in accordance with an exemplary embodiment.

In this regard, while the example magnetic coupling assembly of FIG. 1 is illustrated in the context of a single input rotor assembly (131) driving two output rotor assemblies (132, 133), it will be appreciated that the present invention is not so limited: any given input rotor assembly may be magnetically coupled to any number of output rotor assemblies, including, in some embodiments, a single output rotor assembly.

It will also be appreciated that the various components illustrated in FIG. 1 are not necessarily drawn to scale. For example, while rotor assemblies 131, 132, and 133 are illustrated as having substantially identical diameters, in some embodiments the rotor assemblies are configured with different diameters (including different radial locations of their respective magnets) to achieve a particular mechanical advantage and/or rotational speed ratio. In the interest of clarity, various conventional mechanical components well known in the art have not been illustrated in FIG. 1, such as bearings, shaft couplings, output loads (e.g., electrical generators), input drives (e.g., electrical motors) and the like.

In order to achieve the desired magnetic coupling behavior, each pair of adjacent magnetically coupled rotor assemblies (e.g., input rotor assembly 131 and output rotor assembly 133) are positioned such that their circumferences overlap by a distance $d_1$ (in a direction orthogonal to their axes of rotation) and are separated by a distance $d_2$ (in a direction parallel to their axes of rotation) as shown. In one embodiment, $d_1$ ranges from 1.5 to 2.5 cm (preferably about 2.0 cm), and $d_2$ ranges from 0.125 to 0.635 cm (preferably about 0.380 cm). These dimensions may vary (and may be optimized either analytically or empirically) depending upon, among other things, the geometry of the rotor assemblies and the strength, size, and distribution of the individual magnets.

During operation, by virtue of magnetic coupling, output shafts 121 and 122 rotate in response to rotation of input shaft 110, which may be driven, for example, by an electrical motor or the like (not illustrated). Depending upon the radial position of the circular array of magnets integrated into each rotor assembly (also referred to as the "effective diameter"), the available torque and rotational speed of each output shaft 121 and 122 ($\tau_{o1}$, $\omega_{o1}$, $\tau_{o2}$, $\omega_{o2}$) can be computed as a function of the applied torque and rotational speed of input shaft 110 ($\tau_{in}$, $\omega_{in}$).

For example, consider an embodiment in which the effective diameters of rotor assemblies 131, 132, and 133 are equal. In such a case, $\omega_{o1} = \omega_{o2} = \omega_{in}$, and the torque available at each output 121 and 122 is equal to half that of input 110, i.e.: $\tau_{o1} = \tau_{in}/2$; $\tau_{o2} = \tau_{in}/2$. Thus, given that that the power provided by each axle is the product of torque and rotational speed, the power available at outputs 121 and 122 is half that of input 110, minus any losses. In accordance with the present invention, such losses are extremely low (indeed, even negligible) as a result of the non-contact, frictionless nature of the magnetic coupling between adjacent rotor assemblies—particularly when compared to the substantial loss to friction and heat that arises between mechanical gears in conventional systems.

Having thus given an overview of an example magnetic coupling assembly, the individual rotor assemblies will now be described with reference to the flowchart of FIG. 6 in conjunction with FIGS. 2-5.

Referring first to the exemplary method 600 of FIG. 6, a method of assembling a magnetic coupling system in accordance with various embodiments generally includes: providing a set of magnets (e.g., rare earth magnets, such as N52 Neodymium magnets (step 601); inserting or otherwise integrating a portion of those magnets into a first rotor disk (step 602); inserting or otherwise integrating a portion of the magnets into a second rotor disk (step 603), placing the pair of disks face-to-face (e.g., with N-orientated faces adjacent to each other) and rotating the disks gradually until the disks attract each and become magnetically secured, thereby forming a single magnetic rotor assembly (step 604); connecting the magnetic rotor assembly to an axle (step 605); and combining the magnetic rotor assembly with one or more other, adjacent magnetic rotor assemblies to form the finished magnetic coupling assembly (step 606). Each of these steps will now be described in further detail.

Figure 2:
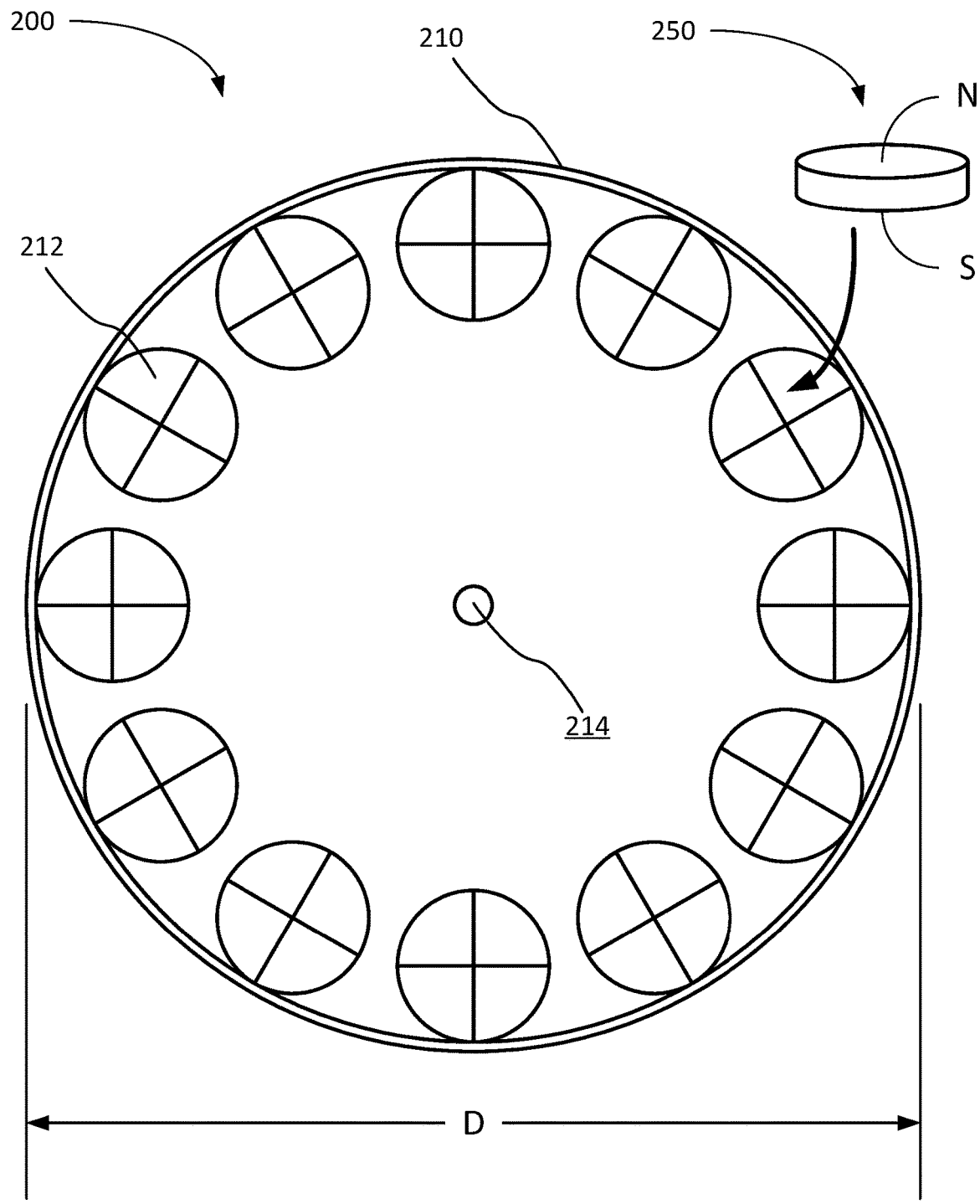
FIG. 2 illustrates the insertion of magnets into a rotor disk in accordance with various embodiments.

Referring first to the exemplary rotor disk 200 illustrated in FIG. 2, assembly begins with the step of procuring a set of magnets 250. In one embodiment, for example, each magnet 250 is a circular, nickel-plated N52-type neodymium rare earth magnet having a 1.0" diameter and a thickness of ⅛". Magnets 250 and are then fixed circumferentially in a regular pattern to a rotor disk (or "disk body") 210 such that their magnetic poles face the same direction (e.g., all N-poles facing out of the page relative to FIG. 2).

In one embodiment, rotor disk 210 is an aluminum, carbon fiber, or graphite disk (e.g., a 3D-printed graphite disk) having an outer diameter D of 7.0", a thickness of 3/16", and a central bore 214 having an inner diameter (e.g., ½") configured to accept an axle as described above.

Twelve recessed regions 212 are formed within disk 210, each configured to tightly receive a corresponding magnet 250. Thus, regions 212 exhibit 12-fold rotational symmetry and are arranged at regular 30-degree increments around the perimeter. Magnets 250 may be secured within their corresponding recesses with a suitable adhesive, such as a UV-protected water-proof adhesive. In the illustrated embodiment, magnets 250 are positioned ⅜" away from the perimeter of disk 210 and their centers are approximately ½" apart.

It will be appreciated that the rotor disk 200 as illustrated in FIG. 2 is not intended to be limiting in any way. Magnets 250 may have a variety of geometries (thickness, shape, etc.), and any number of such magnets (e.g., greater than or less than 12) may be secured to disk 210. In addition, magnets may be positioned closer or farther away from the perimeter of disk 210.

FIGS. 3A and 4A sequentially illustrate isometric views of the joining of two magnetic rotor disks together to form a magnetic rotor assembly in accordance with one embodiment. FIGS. 3B and 4B sequentially illustrate planar views, corresponding to the isometric views in FIGS. 3A and 4A, of the joining of two magnetic rotor disks together to form a magnetic rotor assembly in accordance with one embodiment. More particularly, FIGS. 3A and 3B illustrate two assembled rotor disks 301 and 302 being brought together such that their inner faces (310, 320) each correspond to the N-poles of their respective magnets and their outer surfaces 311 and 321 conversely correspond to their S-poles. In additional or alternative implementations, the rotor disks 301, 302 may be joined by bringing together faces corresponding to the S-poles of the respective magnets.

When the individual magnets on each face 310 and 320 are perfectly aligned N-to-N, the resulting repulsive force will prevent rotor disks 301 and 302 from magnetically attaching to each other. However, upon slight rotation of the disks (e.g., about 15 degrees) such that the magnets are staggered, the magnetic fields of the magnets will be arranged in such a fashion that the rotor disks will attract and securely attach to each other (FIGS. 4A and 4B).

FIG. 5 is a partially transparent view of a magnetic rotor assembly 500 such as that illustrated in FIGS. 3A, 3B, 4A, and 4B, showing the relative positions of the enclosed magnets. It will be apparent that the regular circumferential spacing of the magnets around the perimeter of the finished disk assembly will give rise to a similarly regular, circumferential spatial modulation in magnetic field, effectively forming a "magnetic gear" (with the regular variations in field orientation and strength corresponding to the "teeth" of the gear). Unlike mechanical gears, however, when the disk assemblies are placed adjacent to each other as shown in FIG. 1, the result is a particularly effective form of rotational magnetic coupling that is at the same time strong (i.e., adjacent disk assemblies are strongly magnetically coupled) and low-friction (due to the non-contact nature of the coupling).

While the foregoing detailed description will provide those skilled in the art with a convenient road map for implementing various embodiments of the invention, it should be appreciated that the particular embodiments described above are only examples, and are not intended to limit the scope, applicability, or configuration of the invention in any way. To the contrary, various changes may be made in the function and arrangement of elements described without departing from the scope of the invention. As used herein, the word "exemplary" means "serving as an example, instance, or illustration." Any implementation described herein as "exemplary" is not necessarily to be construed as preferred or advantageous over other implementations, nor is it intended to be construed as a model that must be literally duplicated.

I claim:

1. A device, comprising:
a first rotor assembly and a second rotor assembly each comprising:
a first rotor disk comprising a first disk and a first plurality of permanent magnets circumferentially disposed about an outer perimeter of the first disk such that a first polarity for each permanent magnet of the first plurality of permanent magnets faces outward from a first side of the first disk; and
a second rotor disk comprising a second disk and a second plurality of permanent magnets circumferentially disposed about an outer perimeter of the second disk such that the first polarity for each permanent magnet of the second plurality of permanent magnets faces outward from a first side of the second disk;
wherein the first side of the first disk faces and contacts the first side of the second disk,
wherein the first disk and the second disk are rotated to offset relative positions such that the first plurality of permanent magnets and the second plurality of permanent magnets are in a staggered arrangement,
a first shaft fixedly coupled to the first rotor assembly and positioned to rotate the first rotor assembly in a first plane; and
a second shaft fixedly coupled to the second rotor assembly and positioned to rotate the second rotor assembly in a second plane, different than the first plane, wherein the first plane is separated from the second plane by a predetermined distance such that the first rotor assembly is magnetically coupled to, and not mechanically coupled to, the second rotor assembly.

2. The device of claim 1, wherein the first disk and the second disk of the first rotor assembly have a first diameter, and wherein the first disk and the second disk of the second rotor assembly have a second diameter, different than the first diameter.

3. The device of claim 1, wherein the first disk and the second disk of the first rotor assembly have a first diameter, and wherein the first disk and the second disk of the second rotor assembly have the first diameter, wherein the first plurality of permanent magnets and the second plurality of permanent magnets of the first rotor assembly are located a first distance from the first shaft, wherein the first plurality of permanent magnets and the second plurality of permanent magnets of the second rotor assembly are located a second distance from the first shaft, different than the first distance.

4. The device of claim 1, wherein the first rotor assembly overlaps the second rotor assembly, in a direction orthogonal to respective axes of rotation for the first rotor assembly and the second rotor assembly, by between 1.5 to 2.5 centimeters.

5. The device of claim 1, wherein the predetermined distance is between 0.125 to 0.635 cm in a direction parallel to respective axes of rotation for the first rotor assembly and the second rotor assembly.

6. The device of claim 1, further comprising:
a third rotor assembly, also comprising, as the first rotor assembly and the second rotor assembly each comprise:
the first rotor disk comprising the first disk and the first plurality of permanent magnets circumferentially disposed about the outer perimeter of the first disk such that the first polarity for each permanent magnet of the first plurality of permanent magnets faces outward from the first side of the first disk; and
the second rotor disk comprising the second disk and the second plurality of permanent magnets circumferentially disposed about an outer perimeter of the second disk such that the first polarity for each permanent magnet of the second plurality of permanent magnets faces outward from the first side of the second disk;

wherein the first side of the first disk faces and contacts the first side of the second disk,
wherein the first disk and the second disk are rotated to offset relative positions such that the first plurality of permanent magnets and the second plurality of permanent magnets are in a staggered arrangement, and
a third shaft fixedly coupled to the third rotor assembly and positioned to rotate the third rotor assembly in a third plane, different than the second plane, wherein the second plane is separated from the third plane by a second predetermined distance such that the second rotor assembly is magnetically coupled to, and not mechanically coupled to, the third rotor assembly.

7. The device of claim 1, wherein the first disk and the second disk are made of graphite.

8. The device of claim 1, wherein:
each permanent magnet of the first plurality of permanent magnets is located a predetermined arc distance from adjacent permanent magnets of the first plurality of permanent magnets about the first disk;
each permanent magnet of the second plurality of permanent magnets is located the predetermined arc distance from adjacent permanent magnets of the second plurality of permanent magnets about the second disk; and
the staggered arrangement offsets the first disk relative to the second disk by half of the predetermined arc distance.

9. The device of claim 1, wherein each of permanent magnet of the first plurality of permanent magnets and the second plurality of permanent magnets has a first diameter, wherein the first disk and the second disk each have a second diameter, and wherein the first diameter is approximately 1/7 of the second diameter.

10. The device of claim 1, wherein:
the first rotor assembly is configured with a first radial distance for the first plurality of magnets relative to the first shaft;
the second rotor assembly is configured with a second radial distance for the second plurality of magnets relative to the second shaft; and
the first radial distance is different than the second radial distance.

11. The device of claim 1, wherein:
the second face of the second rotor assembly overlaps the first face of the first rotor assembly by a second distance,
the second distance is between 0.125 to 0.635 centimeters; and
the predetermined distance is between 1.5 to 2.5 centimeters.

12. A method for magnetic coupling, comprising:
coupling, magnetically and not mechanically, a first rotor assembly with a second rotor assembly;
applying a rotation to a first shaft that is fixedly connected to the first rotor assembly;
transferring, over a gap that separates the first rotor assembly from the second rotor assembly, the rotation to the second rotor assembly via a magnetic coupling between the first rotor assembly and the second rotor assembly,
wherein each of the first rotor assembly and the second rotor assembly include:
a first rotor disk comprising a first disk and a first plurality of magnets circumferentially disposed about an outer perimeter of the first disk such that a first polarity for each permanent magnet of the first plurality of magnets faces outward from a first side of the first disk; and
a second rotor disk comprising a second disk and a second plurality of magnets circumferentially disposed about an outer perimeter of the second disk such that the first polarity for each permanent magnet of the second plurality of magnets faces outward from a first side of the second disk; and
wherein the first side of the first disk faces and contacts the first side of the second disk,
wherein the first disk and the second disk are rotated to offset relative positions such that the first plurality of magnets and the second plurality of magnets are in a staggered arrangement.

13. The method of claim 12, wherein the rotation is applied to the first shaft at a first angular speed, and is transferred to a second shaft connect to the second rotor assembly at a second angular speed, different than the first angular speed, via the first rotor assembly being configured to position a first plurality of magnets at a first radial location relative to the first shaft and the second rotor assembly being configured to position a second plurality of magnets at a second radial location relative to the second shaft, wherein the first radial location is different than the second radial location.

14. The method of claim 12, wherein the first shaft is connected on a first end to the first rotor assembly and on a second end, opposite to the first end, to an input source that provides the rotation.

15. The method of claim 12, wherein the second rotor assembly is connected via a second shaft to an output load.

16. The method of claim 12, further comprising:
coupling, magnetically and not mechanically, the second rotor assembly with a third rotor assembly; and
transferring, over a second gap that separates the second rotor assembly from the third rotor assembly, the rotation to the third rotor assembly via a second magnetic coupling between the second rotor assembly and the third rotor assembly.

* * * * *